United States Patent
Herrera

(10) Patent No.: US 6,477,765 B1
(45) Date of Patent: Nov. 12, 2002

(54) METHOD OF FABRICATING A MAGNETIC WRITE TRANSDUCER

(75) Inventor: Steven Charles Herrera, Littleton, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/433,266

(22) Filed: Nov. 4, 1999

(51) Int. Cl.[7] .......................... G11B 5/127; H04R 31/00
(52) U.S. Cl. ................... 29/603.14; 29/603.07; 29/603.15; 29/603.13; 29/603.16; 29/603.18; 360/122; 360/123; 360/125; 360/126; 360/317
(58) Field of Search .................. 29/603.07, 603.15, 29/603.13, 603.16, 603.18, 603.14; 360/122, 123, 125, 126, 317

(56) References Cited

U.S. PATENT DOCUMENTS

| | | | |
|---|---|---|---|
| 4,589,042 A | | 5/1986 | Anderson et al. |
| 4,610,935 A | | 9/1986 | Kumasaka et al. |
| 4,884,157 A | * | 11/1989 | Roberts ....................... 360/125 |
| 5,141,623 A | * | 8/1992 | Cohen ......................... 205/122 |
| 5,157,570 A | * | 10/1992 | Shukovsky ................... 360/126 |
| 5,200,056 A | * | 4/1993 | Cohen ......................... 205/122 |
| 5,224,002 A | | 6/1993 | Nakashima et al. |
| 5,264,981 A | | 11/1993 | Campbell et al. |
| 5,283,942 A | | 2/1994 | Chen et al. ................... 360/126 |
| 5,314,596 A | * | 5/1994 | Shukovsky ................... 204/192.2 |
| 5,590,008 A | * | 12/1996 | Tanabe ......................... 360/126 |
| 5,606,478 A | | 2/1997 | Chen et al. ................... 360/126 |
| 5,673,163 A | * | 9/1997 | Cohen ......................... 360/126 |
| 5,751,528 A | * | 5/1998 | Nepela ......................... 360/126 |
| 5,831,801 A | | 11/1998 | Shouji et al. ................. 360/126 |
| 5,850,325 A | | 12/1998 | Miyauchi et al. |
| 5,864,450 A | | 1/1999 | Chen et al. |
| 6,025,978 A | * | 2/2000 | Hoshi ......................... 360/113 |
| 6,151,193 A | * | 11/2000 | Terunuma .................... 360/126 |
| 6,154,345 A | | 11/2000 | Ishiwata et al. .............. 360/317 |
| 6,301,075 B1 | * | 10/2001 | Sato ........................... 360/126 |

FOREIGN PATENT DOCUMENTS

| | | |
|---|---|---|
| JP | 62066411 | 3/1987 |
| JP | 05054331 | 3/1993 |
| JP | 10021507 | 1/1998 |
| JP | 10283616 | 10/1998 |
| WO | 99 28904 | 6/1999 |

OTHER PUBLICATIONS

T. Koshikawa et al., A New Write Head Trimmed at Wafer Level by Focused Ion Beam, *Transactions on Magnetics*, Oct. 16, 1997, pp. 1471–1473, vol. 34, New York, USA.

* cited by examiner

*Primary Examiner*—Carl J. Arbes
*Assistant Examiner*—Paul Kim
(74) *Attorney, Agent, or Firm*—Brooks & Kushman P.C.

(57) ABSTRACT

What is disclosed is a method of fabricating a thin film magnetic write transducer and the resulting write transducer structure. The method starts with the formation of a bottom pole of the write transducer on a base layer or substrate. This is followed by the formation of a write gap layer, formation of a coil, and formation a coil insulating layer. A thin top pole inner layer is then deposited over the entire structure. Next, a thick top pole outer layer is formed over the top pole inner layer. Preferably, the top pole outer layer is formed by plating through a photoresist mask that defines the top pole shape. Finally, the top pole inner layer is milled using the top pole outer layer as a mask. The top pole produced by this method has parallel sidewalls that are helpful in writing narrow data tracks. Use of the photoresist mask during plating of the top pole outer layer and ion milling of the top pole inner layer provides good dimensional control of the top pole's width. The two layer structure of the top pole allows the inner layer to be chosen for optimal write performance while the outer layer is chosen for fabrication considerations. In an alternative embodiment, the bottom pole is also fabricated in two layers that mirror the top pole layers.

8 Claims, 4 Drawing Sheets

METHOD OF FABRICATING A MAGNETIC WRITE TRANSDUCER

TECHNICAL FIELD

This invention relates to the field of thin film magnetic write transducer structures and methods of fabrication.

BACKGROUND ART

Magnetic storage media use increasingly narrower track widths to increase the amount of data that can be recorded per square inch. The decrease in track width results in a weaker residual magnetic flux that must be sensed by the read transducers during data recovery. To increase the residual magnetic flux, magnetic materials with high coercive values are used in the storage media. The narrow track widths and high coercive values place high demands on the write transducers to write the data in the magnetic storage media. Narrow track widths require tight control of the pole dimensions and shape, in particular, of the top pole in thin film magnetic write transducers. High coercive magnetic storage media require the write transducer to produce high magnetic flux densities at the pole tips. Such high magnetic flux densities often result in the saturation of common magnetic materials such as Permalloy (80:20 NiFe)

Two widely used methods of controlling pole width and pole sidewall profiles during wafer fabrication are electroplating and ion milling. Optically patterned photoresist layers produce well defined, steep sidewall profiles that make excellent electroplating templates. In an electroplating process, an electrically conductive seedlayer is deposited on the wafer before the photoresist. The photoresist is then deposited, exposed, and developed. Plating is then performed with the seedlayer carrying the plating current. After plating, the photoresist is stripped and a quick etch removes the unwanted areas of the seedlayer. A drawback to this process is that a plated pole tends to be softer than a vacuum deposited pole. This results in a shorter life span for thin film magnetic heads in tape applications where the poles are subject to pole tip recession (PTR).

An ion milling process or focused ion beam can be used to trim poles created by plating, vacuum deposition, or any other method. Trimming is typically performed with ions impacting the air bearing surface or tape bearing surface of the thin film magnetic write heads. As a result, the trimming must be performed after the wafer has been cut and the air or tape bearing surfaces have been polished. This requirement complicates the fabrication process since subsections of the original wafer must be handled individually during these trimming steps. This process also leaves cavities in the air or tape bearing surfaces that can create problems in both hard disk and tape applications. In the case of ion milling, two extra processing steps are required to trim the poles. One extra step is the formation of an ion milling mask that defines where the poles are trimmed. The second extra step is the removal of the mask after the ion milling is completed. The mask itself is etched during the ion milling and some of the mask material is redeposited on the exposed pole. This can result in a rough air/tape bearing surface that impacts normal operations. Ion milling for long periods of time also result in sidewall sloping that further complicates control over the final pole dimensions.

In the article "A New Write Head Trimmed at Wafer Level by Focused Ion Beam," IEEE Transactions on Magnetics, Volume 34, No. 4, July 1998 by Koshikawa et al., a fabrication method is disclosed where the pole tips are trimmed at the wafer level. After the top poles are deposited and patterned, a focused ion beam is used to trim the top poles, the write gaps, and part of the bottom poles to the desired width and shape. Subsequent insulation depositions fill any voids created by the ion trimming. The result is a top pole sidewall that is approximately normal to the write gap layer at the air or tape bearing surface. The Koshikawa process, though, is time consuming as the ion beam must cut through the entire thickness of the top pole.

Different approaches have been taken in attempts to increase the saturation magnetization limit at the pole tips of thin film magnetic write heads. For example, U.S. Pat. No. 5,224,002 issued to Nakashima et al. on Jun. 29, 1993 discloses a thin film magnetic head where the top and/or bottom poles each consist of two layers of magnetic material. The outer magnetic layers (furthest from the write gap layer) of the poles are fabricated with conventional magnetic materials that have conventional saturation magnetization characteristic. Disposed between the outer magnetic layers and the write gap layer are inner layers composed of a high saturation magnetization material. These high saturation magnetization layers allow the thin film magnetic head to produce a high magnetic flux density immediately adjacent the write gap where it is the most influential during writing.

Another approach for increasing the magnetic flux density at the pole tips is disclosed in U.S. Pat. No. 4,589,042 issued to Anderson et al. on May 13, 1986. Anderson discloses a thin film magnetic head where the regions of the top and bottom poles between the pole tips and coil windings are made of a high saturation magnetization material. The region of the poles adjacent the coil windings are made of conventional magnetic materials. This configuration allows a higher magnetic flux density at the pole tips than if the poles were fabricated entirely using the conventional magnetic materials.

U.S. Pat. No. 4,610,935 issued to Kumasaka et al. on Sep. 9, 1986 discloses a magnetic film structure consisting of very thin alternating layers of two different magnetic materials laminated together to produce a magnetic film having a high saturation magnetic induction and a low coercive force. Layers of a nonmagnetic insulating material may be included in the structure to help minimize eddy currents in thick films.

These various methods of increasing the saturation magnetization focus mainly on the magnetic flux at the pole tips. The Kumasaka disclosure also discusses the difficulties associated with the top pole layer transitioning between the thin write gap layer and the thicker coil insulating layer. Changes in the topology of the top pole can result in variations in the thickness and thus the magnetic properties. Kumasaka discloses that the multiple layers of the laminated film maintain the film's magnetic properties through the steps in the topology. An assumption is made that the thickness of the laminated film is the same on flat regions as on sloped regions. This assumption is not always true when the top pole material is deposited by vacuum deposition or other methods involving a laminar deposition.

DISCLOSURE OF INVENTION

The present invention is a method of fabricating a thin film magnetic write transducer, and the resulting write transducer structure. The fabrication method involves deposition and patterning of a bottom pole, a write gap layer, a coil and a coil insulating layer. In subsequent steps, the method forms a top pole having two layers of magnetic material. A thin inner layer of high saturation magnetization material is disposed at wafer level after the coil insulating layer has been formed. Next, a photoresist layer is deposited and patterned above the top pole inner layer. A top pole outer layer is plated over the top pole inner layer using the photoresist layer as a plating mask. Plating is a quick and inexpensive method of building up the desired thickness of the top pole. After plating of the top pole outer layer has been completed and the photoresist has been stripped, the top pole inner layer is ion milled using the top pole outer layer as a mask. An advantage of this process is that only the thin top pole inner layer needs to be ion milled instead of the entire top pole thickness. This process provides good control of the top pole's dimensions and results in a steep sidewall profile suitable for writing narrow data tracks in a magnetic storage media. By using a high saturation magnetization material for the top pole inner layer, the write transducer can produce a high magnetic flux density required to write in high coercive magnetic storage media. The rate at which the pole tips erode in magnetic tape applications is slowed when a hard magnetic material is used as the top pole inner layer.

In alternative embodiments, the bottom pole of the write transducer may also be fabricated in two layers. First, a bottom pole outer layer is formed on the substrate or undercoat layer. Next, a bottom pole inner layer is deposited to cover the bottom pole outer layer. A protective photoresist etch hat is formed to protect the desired regions of the bottom pole inner layer. The unwanted regions of the bottom pole inner layer are then removed using ion milling, wet chemical etching or other suitable process. Finally, the protective photoresist etch hat is removed. As with the top pole inner layer, using a high saturation magnetization material for the bottom pole inner layer increases the magnetic flux density that the write transducer is capable of producing. Using a hard magnetic material for the bottom pole inner layer slows the pole tip recission rate in magnetic tape applications.

Accordingly, it is an object of the present invention to provide a method for fabricating a thin film magnetic write transducer where the top pole is fabricated in two layers, a top pole inner layer adjacent to the write gap and a top pole outer layer, and where the top pole inner layer is patterned using the top pole outer layer as a mask.

Another object of the present invention is to provide a method for fabricating a thin film magnetic write transducer that provides good control over the dimensions of the top pole at the media bearing surface, and produces approximately parallel sidewalls in the top pole.

Another object of the present invention is to provide a method for fabricating the bottom pole in two layers.

Yet another object of the present invention is to provide a thin film magnetic write transducer structure produced by the above processes.

These and other objects, features and advantages will be readily apparent upon consideration of the following detailed description in conjunction with the accompanying drawings.

BEST MODE FOR CARRYING OUT THE INVENTION

Several terms are used in this document in a generic sense. The term "forming" is meant to include any combination of fabrication steps that result in the deposition and patterning of a layer. This includes depositing a layer followed by a subsequent patterning using a masking layer to control the removal of unwanted material. It also includes the deposition of a patterning mask layer that is used to control a subsequent deposition. The term "deposition" is any method of creating a layer of material over the existing surface. Deposition includes sputtering, evaporation, chemical vapor deposition, plating and other like methods known in the art. The term "patterning" is any method of defining a geometric area or areas where a layer will and will not exist. Patterning includes wet chemical etching, electrochemical machining, lift off techniques, ion milling, focused ion beams and other like methods used in the art.

Figure 1:
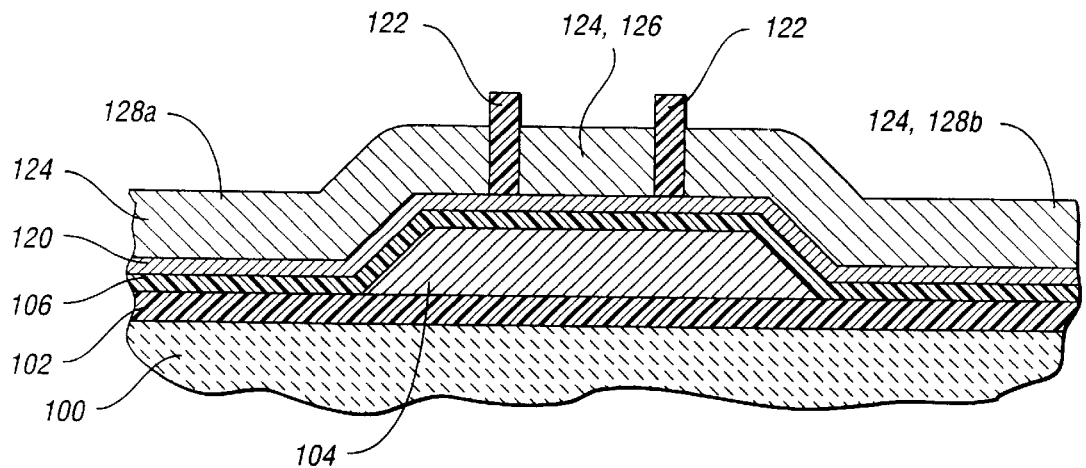
FIG. 1 is a first profile of a thin film magnetic write transducer as seen from the media bearing surface after depositing the top pole outer layer.
Figure 2:
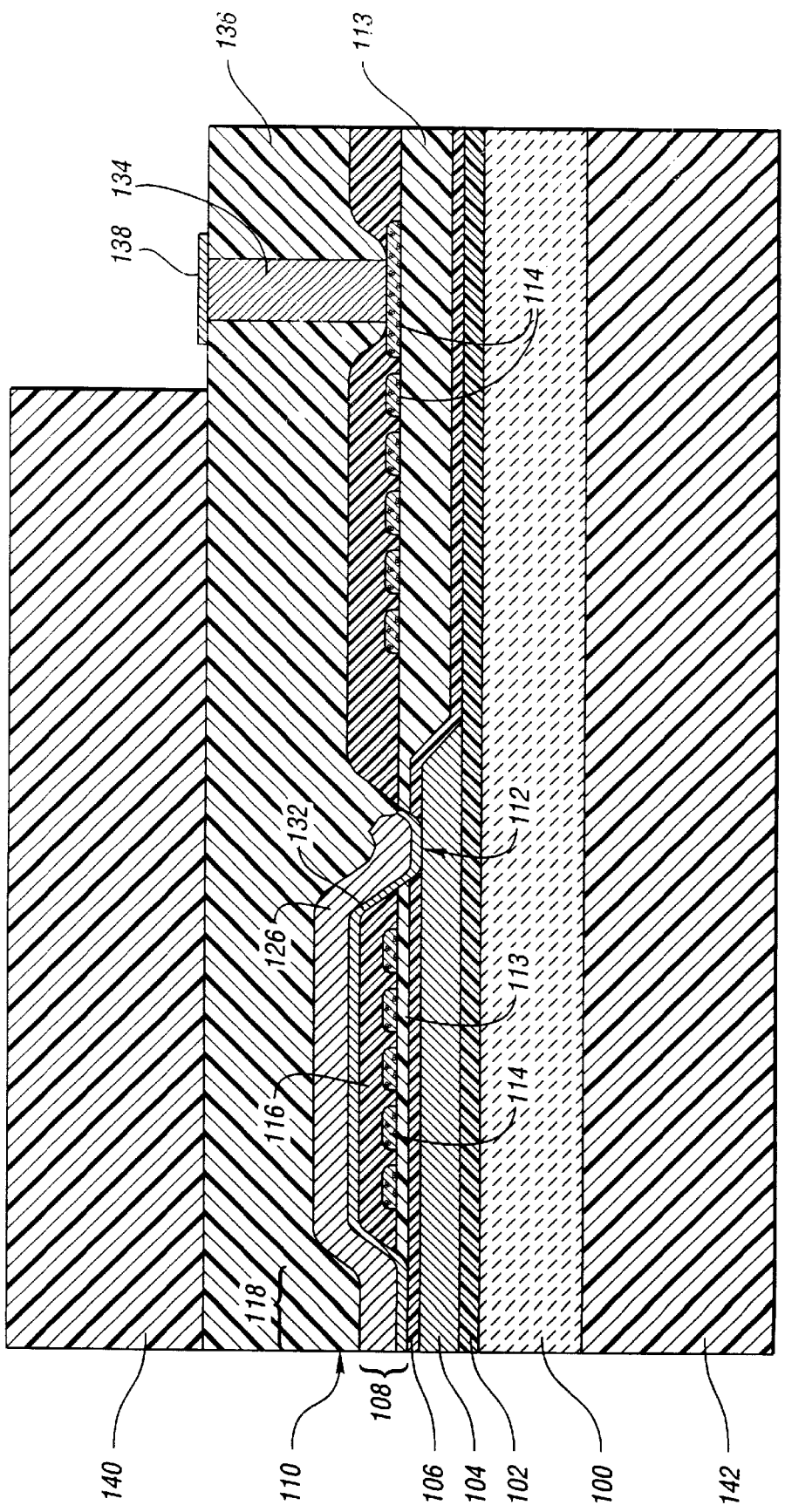
FIG. 2 is a second profile of the thin film magnetic write transducer taken perpendicular to the media bearing surface.

Referring to FIG. 1 and FIG. 2, the process for fabricating a thin film magnetic write transducer in accordance with the present invention begins with cleaning a starting or base layer. The base layer may be either a wafer substrate 100 or an undercoat layer 102 deposited on the wafer substrate 100. The undercoat layer 102 may be an electrically insulating material such as alumina or other suitable material. A lapping strap seedlayer (not shown) is then formed on the base layer to produce resistive elements. The lapping strap seedlayer is used later in the process to monitor the progress of a final lapping step. Seedlayers are very thin electrically conductive layers usually on the order of 800 to 1000 angstroms thick.

A bottom pole 104 is formed following the formation of the lapping strap seedlayer. Formation of the bottom pole 104 typically, but not necessarily, consists of the steps of vacuum depositing the magnetic material, annealing, depositing a photoresist (not shown), photoresist exposure and development, an oxidation milling through the developed photoresist, wet chemical etching the magnetic material, and stripping of the photoresist. A preferred material for the bottom pole 104 is a cobalt zirconium tantalum (CZT) alloy deposited to a thickness of approximately 4.4 micrometer. Various nickle iron alloys, such as 45:55 NiFe and 50:50 NiFe, iron nitride alloys, and nickle iron nitride alloys may also be used in place of the CZT layer to achieve the desired saturation magnetization characteristics and hardness. Plated nickle iron alloys, however, are generally softer than the cobalt-based alloys and thus are more susceptible to pole tip recission in magnetic tape applications.

Next, a write gap layer 106 is deposited on the wafer. The write gap layer 106 is typically, but not necessarily, a sputtered alumina material deposited to a thickness of approximately 0.65 micrometers. The write gap layer 106 forms a write gap or break in the magnetic yoke formed by the bottom pole 104 and the top pole 108. A write signal induced in the magnetic yoke generates fringe magnetic fields across the write gap at the media bearing surface 110. (The media bearing surface 110 is commonly called an air bearing surface in hard disk applications, and a tape bearing surface in magnetic tape applications.) These fringe magnetic fields write data to the magnetic storage media (not shown) by creating remnant magnetic fields in a magnetic storage media. The write gap layer 106 is patterned to open a back gap via 112 that allows the top pole 108 to connect with the bottom pole 104 completing the magnetic yoke. Following the creation of the back gap via 112, a planarizing photoresist layer 113 is deposited and hardened by baking.

A coil 114 is formed on the planarizing photoresist layer 113. Most of the coil 114 is then covered by a coil insulating layer 116. The coil insulating layer 116 is patterned so as not to cover the write gap layer 106 in the pole tip region 118, the back gap via 112 where the top pole 108 and bottom pole 104 connect, and the ends of the coil 114. The coil insulating layer 116 provides electrical isolation between individual windings of the coil 114 and the top pole 108. Electrical isolation between the coil 114 and the bottom pole 104 is provided by the planarizing photoresist layer 113. In the preferred embodiment, the coil 114 is made of copper plated in the presence of a photoresist mask (not shown). Other electrical conductors such as gold, and other deposition and patterning methods may also be used to form the coil 114. In an alternative embodiment, the planarizing photoresist layer 113 may be eliminated and the coil 114 formed directly on the write gap layer 106.

Next, another cleaning is performed to insure the write gap layer 106 in the pole tip region 118 is clear of any residue from the previous process steps. This cleaning is followed by a deposition of an initial top pole layer 120. The initial top pole layer 120 is usually, thought not necessarily, the same magnetic material as used to form the bottom pole 104. In the preferred embodiment, the initial top pole layer 120 is a layer of CZT deposited by sputtering to a thickness of approximately 0.75 micrometers.

A photoresist 122 is then deposited, exposed, and developed over the initial top pole layer 120. This photoresist 122 is used to define the shape of the top pole 108. Using the photoresist 122 as a mask, a final top pole layer 124 is plated on the initial top pole layer 120. During the plating process, the initial top pole layer 120 may be used to carry the electrical plating current, or an electrically conductive plating seedlayer (not shown) may be deposited between the initial top pole layer 120 and the photoresist 122 to carry the plating current. In the preferred embodiment, the final top pole layer 124 is Permalloy (80:20 NiFe) plated to a thickness in a range of three to four micrometers. Other nickle iron alloys such as 45:55 NiFe, 50:50 NiFe, cobalt iron alloys and cobalt nickle iron alloy, and other magnetic materials may be used to create the final top pole layer 124. Variations on the plating process may be used to create laminated and doped layers that give the final top pole layer 124 specific electrical characteristics. Note that the final top pole layer 124 is deposited in the area that becomes a top outer layer 126 and in the surrounding areas 128a–b. The final top pole layer 124 is plated in the top pole outer layer 126 and in the surrounding areas 128a–b to assist in plating a uniform thickness over the entire surface of the wafer.

Figure 3:
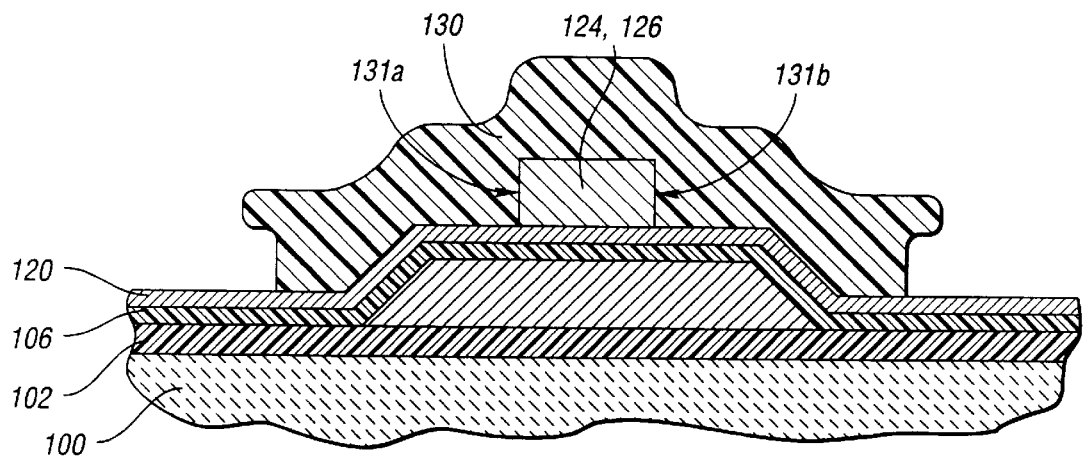
FIG. 3 is the first profile after the excess top pole outer layer is removed.

Referring to FIG. 3, after plating the final top pole layer 124, the photoresist 122 is stripped and an etch hat photoresist 130 is formed. The etch hat photoresist 130 is used to isolate the top pole outer layer 126 from the surrounding areas 128a–b of the final top pole layer 124. The surrounding areas 128a–b of the final top pole layer 124 are then removed using a field etch, leaving only the top pole outer layer 126 of the original final top pole layer 124. An advantage of using the plating process with the photoresist 122 is that the resulting sidewalls 131a–b of the top pole outer layer 126 can be made very steep. Ideally, they are parallel to each other giving the top pole outer layer 126 a uniform width as measured at the media bearing surface 110.

Other deposition and patterning processes may be used to create the top pole outer layer 126. For example, sputtering, evaporation, chemical vapor deposition and other deposition processes known in the art may be used to establish the final top pole layer 124. Patterning methods such as lift off, focused ion beam milling and other patterning methods known in the art may be used to define the top pole outer layer 126 with the steep sidewalls 131a–b. However, such other processes are generally more time consuming and expensive than plating through the photoresist 122. For reference, nickle iron alloys can be plated at a quick rate of approximately one micrometer every seven and one-half minutes.

Figure 4:
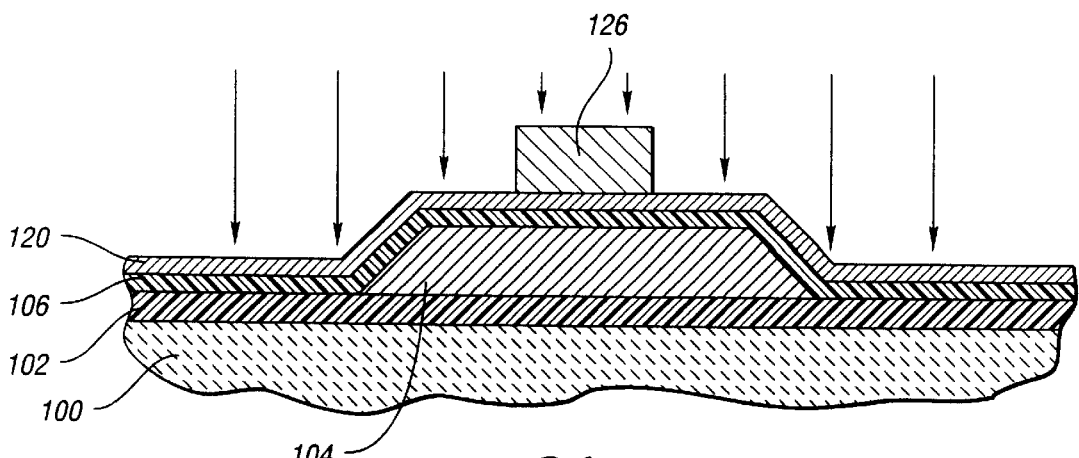
FIG. 4 is the first profile during ion milling.
Figure 5:
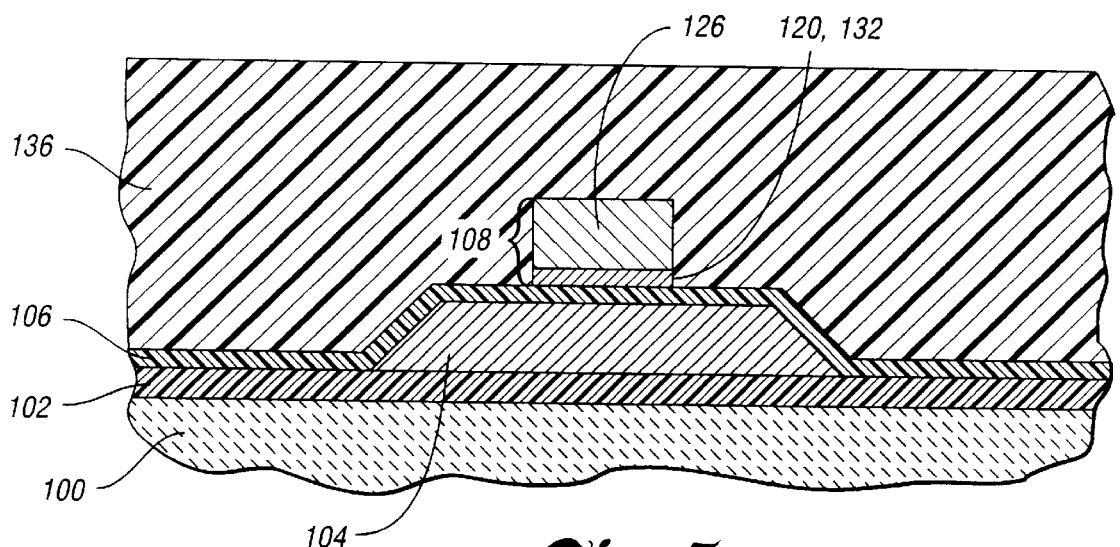
FIG. 5 is the first profile after ion milling.

After stripping the etch hat photoresist 130, the wafer is ion milled, as shown in FIG. 4. Ion milling removes the unwanted areas of the initial top pole layer 120 and the plating seedlayer, if present. The top pole outer layer 126 acts as a mask during the ion milling to preserve the initial top pole layer 120 directly beneath. The preserved initial top pole layer 120 is called hereafter a top pole inner layer 132. Ion milling can be accomplished quickly because the initial top pole layer 120 is thin. A short ion milling duration minimizes the damage done to the top pole outer layer 126. The completed top pole 108 is the combination of the top pole inner layer 132 and the top pole outer layer 126. By using ion milling to etch the initial top pole layer 120, the resulting top pole inner layer 132 has the same uniform width and steep sidewalls as the top pole outer layer 126, as shown in FIG. 5. This gives the process good control over the width of the top pole inner layer 132 which is a critical dimension in the thin film magnetic write transducer.

Unwanted areas of the initial top pole layer 120 may be removed by various other methods known in the art, although there are risks in using omnidirectional etching methods. For example, the first pole layer 120 may undergo a wet chemical etch using the top pole outer layer 126 as a mask. A wet chemical etch will also etch the top pole outer layer 126 causing its width (a critical dimension) to change. The amount of change will depend upon the etch rate and etch time. Differences in the materials used for the top pole outer layer 126 and the initial top pole layer 120 may also result in different etch rates for the two materials. Consequently, the final top pole inner layer 132 may have a different final width than the top pole outer layer 126.

When formation of the top pole 108 has been completed, multiple studs 134 are formed. One stud is formed at each end of the coil 114 and each end of the resistive elements formed by the lapping strap seedlayer. These studs 134 are plated to a thickness ranging between ten and forty micrometers. They provide electrical paths to the coil 114 and lapping strap seedlayer through an overcoat layer 136 applied over the entire structure. The overcoat layer 136 is typically an alumina material deposited to a thickness ranging between ten and fifty micrometers. After deposition, the overcoat layer 136 and studs 134 are lapped flat. Next, bonding pads 138 are formed over each stud 134 on the now flat surface of the overcoat layer 136.

Each magnetic write transducer on the wafer is then electrically tested to identify operational and non-operational transducers. Next, individual transducers or arrays of transducers, depending upon the desired configuration, are cut from the wafer. For magnetic tape applications, the transducers are then mounted between a top closure 140 and a bottom closure 142. Finally, the media bearing surface 110 is lapped to produce a planar surface. During this final lapping step, the resistance of the resistive elements formed in the lapping strap seedlayer are monitored to determine how far the lapping has encroached on the pole tip region 118.

The bottom pole 104 and the top pole inner layer 132 are normally, but not necessarily made of the same material so that they have the same magnetic characteristics. Preferably, the material should have a high saturation magnetization characteristic for writing to high coercive magnetic storage media. The material should also be hard when used in magnetic tape applications to reduce the rate of pole tip recission. In contrast, the top pole outer layer 126 is located further away from the write gap and thus has less influence on the writing characteristics of the transducer. Magnetic materials used for the top pole outer layer 126 are chosen for fabrication considerations. In particular, this material should be inexpensive and quick to deposit and pattern. In practice, the top pole outer layer 126 may have a lower saturation magnetization characteristic and be softer than the top pole inner layer 132.

The process described above may also be used to fabricate a combined thin film magnetic read-write transducer where the read element is a magnetoresistive film or a giant magnetoresistive film. Magnetoresistive film and giant magnetoresistive film magnetic read transducer structures normally consist of a magnetically sensitive film disposed between insulating layers that in turn are flanked by magnetic shields. The process for fabrication of a combined thin film magnetic read-write transducer begins with the process for fabricating the magnetic read transducer and then transitions into the magnetic write transducer process. It is common for the insulating layer and shield layer above the magnetically sensitive film to double as the base layer 102 and bottom pole 104 of the magnetic write transducer.

Figure 6:
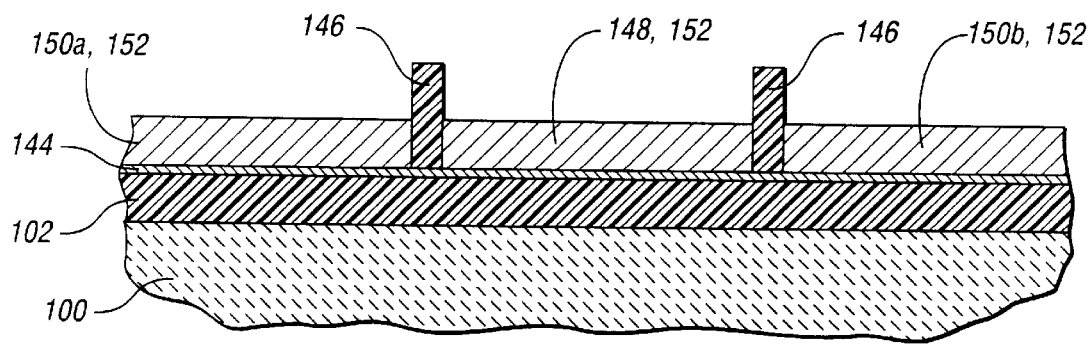
FIG. 6 is a third profile of the thin film magnetic write transducer after plating the bottom pole outer layer as seen from the media bearing surface.

The method of forming the bottom pole 104 may be expanded to create a dual layered bottom pole 104 that is a mirror image of the dual layered top pole 108. Referring to FIG. 6, a seedlayer 144 is first deposited over the base layer. Next, a photoresist 146 is deposited, exposed and developed to define a bottom pole outer layer 148 and surrounding regions 150a–b. An initial bottom pole layer 152 is then plated. In the preferred embodiment, the initial bottom pole layer 152 is made of the same magnetic material as the final top pole layer 124.

Figure 7:
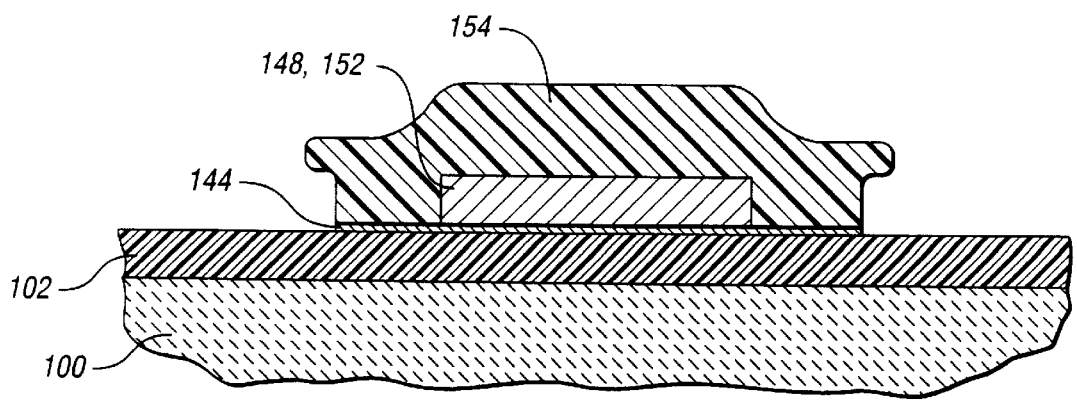
FIG. 7 is the third profile after removing the excess bottom pole outer layer material.

After plating the initial bottom pole layer 152, the photoresist 146 is stripped and an etch hat photoresist 154 is formed over the area of the bottom pole outer layer 152. The initial bottom pole layer 152 is then field etched to remove unwanted magnetic material from the surrounding regions 150a–b, as shown in FIG. 7. After etch hat photoresist 154 is stripped, the seedlayer 144 extending beyond the bottom pole outer layer 148 is removed by ion milling using the bottom pole outer layer 148 as a mask.

Figure 8:
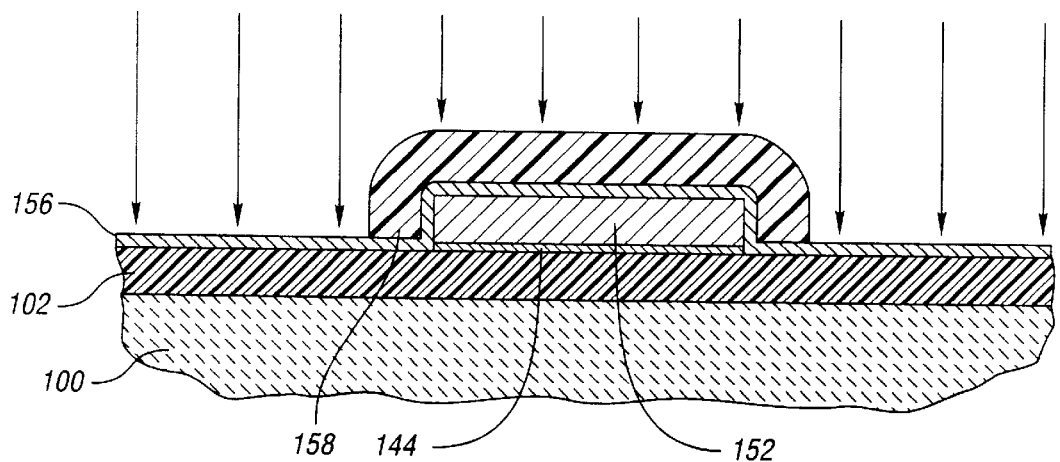
FIG. 8 is the third profile after depositing the bottom pole inner layer and forming an etch hat.
Figure 9:
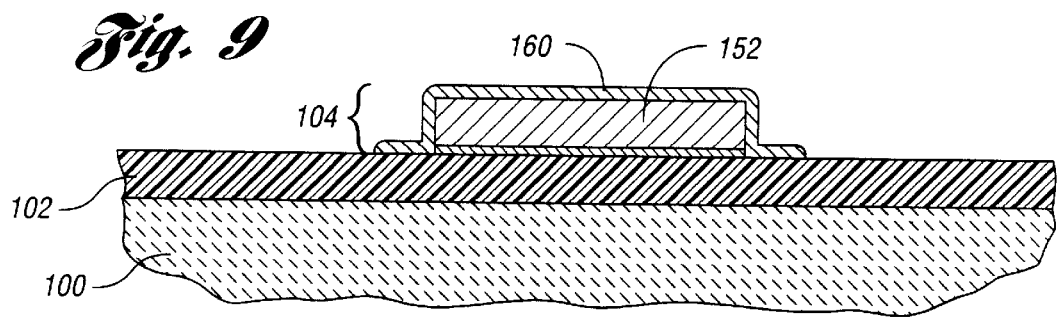
FIG. 9 is the third profile after patterning the bottom pole inner layer.
Figure 10:
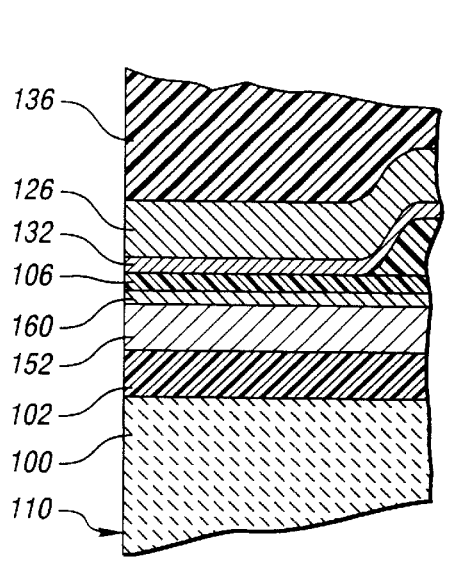
FIG. 10 is a fourth profile of the thin film magnetic write head taken perpendicular to the media bearing surface.

A final bottom pole layer 156 is deposited over the entire wafer, as shown in FIG. 8. This deposition is followed by a formation of an etch hat photoresist 158. Etch hat photoresist 158 masks what becomes a bottom pole inner layer 160 during a subsequent ion milling of the final bottom pole layer 156, as shown in FIG. 9. The resulting bottom pole 104 consists of the bottom pole inner layer 160, nearest the write gap layer 106 (not shown in FIG. 9), and the bottom pole outer layer 152. Referring to FIG. 10, the portion of the bottom pole inner layer 160 that overlaps the bottom pole outer layer 152 on the media bearing surface 110 side is removed by the final lapping step. This leaves the bottom pole outer layer 152 exposed at the media bearing surface 110.

Figure 11:
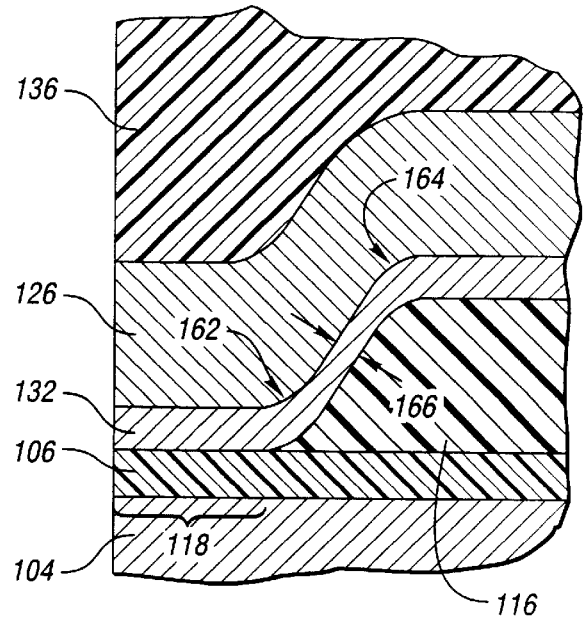
FIG. 11 is the second profile enlarged.

Sputtered magnetic materials may sometime thin and degrade when deposited over an uneven topography. Referring to FIG. 11, these problems may occur in the thin film magnetic write transducer where the top pole inner layer 132 transitions from above the write gap layer 106 to above the coil insulating layer 116. In particular, stress may be induced at the corners in the regions indicated by reference numerals 162 and 164, that change the magnetic properties of the top pole inner layer 132. Thinning of the top pole inner layer 132 thickness, shown by dimension 166, on the slope between corners 162 and 164 can be as high as 30 percent. Consequently, the top pole inner layer 132 may saturate at a lower magnetic flux density in this transition region than in the pole tip region 118.

The process of plating the top pole outer layer 126 over the top pole inner layer 132 helps to minimize or eliminate these problems. Plating creates a top pole outer layer 126 having a uniform thickness that is independent of the topology. The uniform top pole outer layer 126 provides the magnetic flux a path for bypassing the saturated and degraded areas in the top pole inner layer 132.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of fabricating a magnetic write transducer on a base layer, the method comprising:

forming a bottom pole overlaying the base layer;

forming a write gap layer overlaying the bottom pole;

forming a coil overlaying the write gap layer;

forming an insulating layer overlaying the coil;

depositing a top pole inner layer comprised of a first magnetic material overlaying the insulating layer and the write gap layer;

forming a top pole outer layer comprised of a second magnetic material overlaying the top pole inner layer, wherein forming the top pole outer layer includes forming a plating mask overlaying the top pole inner layer;

plating the top pole outer layer onto the top pole inner layer through the plating mask using the top pole inner layer as an electrically conductive path for carrying a plating current; and patterning the top pole inner layer using the top pole outer layer as a mask.

2. The method of claim 1 wherein patterning the top pole inner layer comprises ion milling the top pole inner layer.

3. The method of claim 1 wherein the bottom pole and the first magnetic material are selected from a first group of alloys consisting of cobalt zirconium tantalum alloys, nickle iron alloys, iron nitride alloys, and nickle iron nitride alloys.

4. The method of claim 1 wherein the second magnetic material is selected from a second group of alloys consisting of nickle iron alloys, cobalt iron alloys, and cobalt nickle iron alloys.

5. The method of claim 1 wherein the top pole inner layer is deposited to a thickness of approximately 0.75 micrometers.

6. The method of claim 1 wherein forming the bottom pole comprises:

forming a bottom pole outer layer comprised of the second magnetic material overlaying the base layer;

depositing a bottom pole inner layer comprised of the first magnetic material overlaying the bottom pole outer layer; and patterning the bottom pole inner layer to remove a portion of the bottom pole inner layer to define a shape of the bottom pole.

7. The method of claim 6 wherein patterning the bottom pole inner layer comprises:

forming an etching mask overlaying the bottom pole inner layer; and ion milling the bottom pole inner layer using the etching mask to define the shape of the bottom pole.

8. The method of claim 1 wherein the first magnetic material has a higher saturation magnetization characteristic than the second magnetic material.

* * * * *